(12) United States Patent
Ainspan et al.

(10) Patent No.: US 9,699,009 B1
(45) Date of Patent: Jul. 4, 2017

(54) DUAL-MODE NON-RETURN-TO-ZERO (NRZ)/ FOUR-LEVEL PULSE AMPLITUDE MODULATION (PAM4) RECEIVER WITH DIGITALLY ENHANCED NRZ SENSITIVITY

(71) Applicant: International Business Machines Corporation, Armonk, NY (US)

(72) Inventors: Herschel A. Ainspan, New Hempstead, NY (US); Timothy O. Dickson, Danbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/199,037

(22) Filed: Jun. 30, 2016

(51) Int. Cl.
*H04L 25/49* (2006.01)
*H04B 1/16* (2006.01)
*H04L 7/033* (2006.01)
*H04L 27/02* (2006.01)

(52) U.S. Cl.
CPC ........... *H04L 25/4917* (2013.01); *H04B 1/16* (2013.01); *H04L 7/0332* (2013.01); *H04L 27/02* (2013.01)

(58) Field of Classification Search
CPC ...... H04L 25/4917; H04L 7/0332; H04B 1/16
See application file for complete search history.

(56) References Cited

U.S. PATENT DOCUMENTS

| 7,308,058 | B2 * | 12/2007 | Zerbe | H04L 1/0003 375/259 |
| 7,397,848 | B2 * | 7/2008 | Stojanovic | H04L 25/063 375/229 |
| 7,505,541 | B1 | 3/2009 | Brunn | |
| 8,989,300 | B1 | 3/2015 | Asmanis | |

(Continued)

FOREIGN PATENT DOCUMENTS

GB 2238143 A 5/1991

OTHER PUBLICATIONS

Vladimir Stojanović, Channel-Limited High-Speed Links:Modeling, Analysis and Design. A Dissertation Submitted to the Department of Electrical Engineering and the Committee on Graduate Studies of Stanford University in Partial Fulfillment of the Requirements or the Degree of Doctor of Philosophy. Sep. 2004, pp. 1-180.

*Primary Examiner* — Sophia Vlahos
(74) *Attorney, Agent, or Firm* — Keivan E. Razavi; Otterstedt, Ellenbogen & Kammer, LLP

(57) ABSTRACT

A four-level pulse amplitude modulation receiver has a four-level pulse amplitude modulation mode and a non-return-to-zero modulation mode. First, second, and third four-level pulse amplitude modulation samplers are coupled to an input. Each of the samplers has a corresponding output in turn including a corresponding binary decision of the first, second, and third samplers. A four-level pulse amplitude modulation decoder circuit has inputs coupled to the outputs of the samplers. The four-level pulse amplitude modulation decoder circuit is active in the four-level pulse amplitude (Continued)

modulation mode. The receiver also includes a non-return-to-zero majority voting circuit coupled to the outputs of the samplers. The non-return-to-zero majority voting circuit has an output and is configured to output a majority decision of the corresponding binary decisions of the samplers, and is active in the non-return-to-zero modulation mode.

16 Claims, 11 Drawing Sheets

(56) References Cited

U.S. PATENT DOCUMENTS

| | | |
|---|---|---|
| 9,184,906 B1 | 11/2015 | Min |
| 2003/0016605 A1 | 1/2003 | Tateyama |
| 2003/0081697 A1 | 5/2003 | Little |
| 2013/0241622 A1 | 9/2013 | Zerbe |
| 2015/0249501 A1 | 9/2015 | Nagarajan |

* cited by examiner

| EN | $D_H$ | $D_M$ | $D_L$ | Z |
|---|---|---|---|---|
| 0 | x | x | x | 0 or high impedance |
| 1 | 0 | 0 | 0 | 0 |
| 1 | 0 | 0 | 1 | 0 |
| 1 | 0 | 1 | 0 | 0 |
| 1 | 0 | 1 | 1 | 1 |
| 1 | 1 | 0 | 0 | 0 |
| 1 | 1 | 0 | 1 | 1 |
| 1 | 1 | 1 | 0 | 1 |
| 1 | 1 | 1 | 1 | 1 |

*FIG. 5*

DUAL-MODE NON-RETURN-TO-ZERO (NRZ)/ FOUR-LEVEL PULSE AMPLITUDE MODULATION (PAM4) RECEIVER WITH DIGITALLY ENHANCED NRZ SENSITIVITY

STATEMENT REGARDING FEDERALLY SPONSORED RESEARCH OR DEVELOPMENT

This invention was made with Government support under Contract No.: H98230-12-C-0325 awarded by National Security Agency. The Government has certain rights in this invention.

BACKGROUND

The present invention relates to the electrical, electronic and computer arts, and, more particularly, to communications technologies, and the like.

As data rates in serial links increase beyond 50 Gb/s, multi-level signaling techniques such as 4-level pulse amplitude modulation (PAM4) are finding increased use in electrical as well as optical serial link applications. A PAM4 communication link transmits 2 bits of information per symbol as compared to more traditional non-return-to-zero (NRZ) modulation schemes (also known as 2-level pulse amplitude modulation, or PAM2).

It is common for input/output (I/O) receiver circuitry used to recover data sent across such a link to support both PAM4 and NRZ modulation schemes with the same symbol rates. A relatively trivial modification to the PAM4 receiver circuitry can support the NRZ data recovery. PAM4 receivers employ at least 3 samplers (or slicers) to detect the PAM4 signaling levels. A common technique for enabling NRZ data recovery using PAM4 receiver (RX) circuitry is to use only the sampler responsible for detecting the most significant bit (MSB) of the PAM4 data. This can be done with only 1 of the 3 samplers, and the other 2 samplers are unused.

Existing solutions for NRZ data detection using a PAM4 receiver rely on information from one sampler. This can have drawbacks due to the limited sensitivity of the single sampler, which can be limited by thermal noise or random offset due to device mismatch. Using larger devices can help in mitigating both the noise and offset, but at the expense of higher power (for the sampler and also clocking power).

SUMMARY

Principles of the invention provide techniques for a dual-mode non-return-to-zero (NRZ)/four-level pulse amplitude modulation (PAM4) receiver with digitally enhanced NRZ sensitivity. In one aspect, an exemplary four-level pulse amplitude modulation receiver with a four-level pulse amplitude modulation mode and a non-return-to-zero modulation mode includes an input; and first, second, and third four-level pulse amplitude modulation samplers coupled to the input. Each of the first, second, and third four-level pulse amplitude modulation samplers has a corresponding output in turn including a corresponding binary decision of the first, second, and third samplers. Also included is a four-level pulse amplitude modulation decoder circuit having inputs coupled to the outputs of the first, second, and third four-level pulse amplitude modulation samplers. The four-level pulse amplitude modulation decoder circuit is active in the four-level pulse amplitude modulation mode. The receiver still further includes a non-return-to-zero majority voting circuit coupled to the outputs of the first, second, and third four-level pulse amplitude modulation samplers. The non-return-to-zero majority voting circuit has an output and is configured to output a majority decision of the corresponding binary decisions of the first, second, and third samplers. The non-return-to-zero majority voting circuit is active in the non-return-to-zero modulation mode.

In another aspect, an exemplary method includes operating a four-level pulse amplitude modulation receiver with a four-level pulse amplitude modulation mode and a non-return-to-zero modulation mode in the non-return-to-zero modulation mode. The four-level pulse amplitude modulation receiver has first, second, and third four-level pulse amplitude modulation samplers coupled to a common input. A further step includes, during the operation of the four-level pulse amplitude modulation receiver in the non-return-to-zero modulation mode, feeding outputs of the first, second, and third samplers to a majority voting circuit. The outputs of the first, second, and third samplers include corresponding binary decisions of the first, second, and third samplers. A still further step includes outputting, from the majority voting circuit, a majority decision of the corresponding binary decisions of the first, second, and third samplers.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

Techniques of the present invention can provide substantial beneficial technical effects; for example, one or more embodiments provide any one, some, or all of the following benefits:

reduced susceptibility to decision errors made by a single sampler with concomitant improved receiver sensitivity when operating in NRZ mode; and/or improved receiver robustness in the presence of uncorrelated slicer errors.

These and other features and advantages of the present invention will become apparent from the following detailed description of illustrative embodiments thereof, which is to be read in connection with the accompanying drawings.

BRIEF DESCRIPTION OF THE DRAWINGS

FIG. 5 shows a truth table of the majority vote circuit used in the inventive embodiment of FIG. 4, including an enable signal;

DETAILED DESCRIPTION

For I/O receivers with high-sensitivity requirements when detecting NRZ data (particularly optical links), techniques which include decisions made by the other two unused samplers are possible. One or more embodiments improve the sensitivity of a serial receiver by using information detected by all samplers in a PAM4 serial receiver when operating in an NRZ mode. By using a majority vote of the decisions made by the three samplers, uncorrelated errors (e.g., due to input-referred thermal noise limitations of the samplers) can be reduced and RX sensitivity can be increased.

Figure 1:
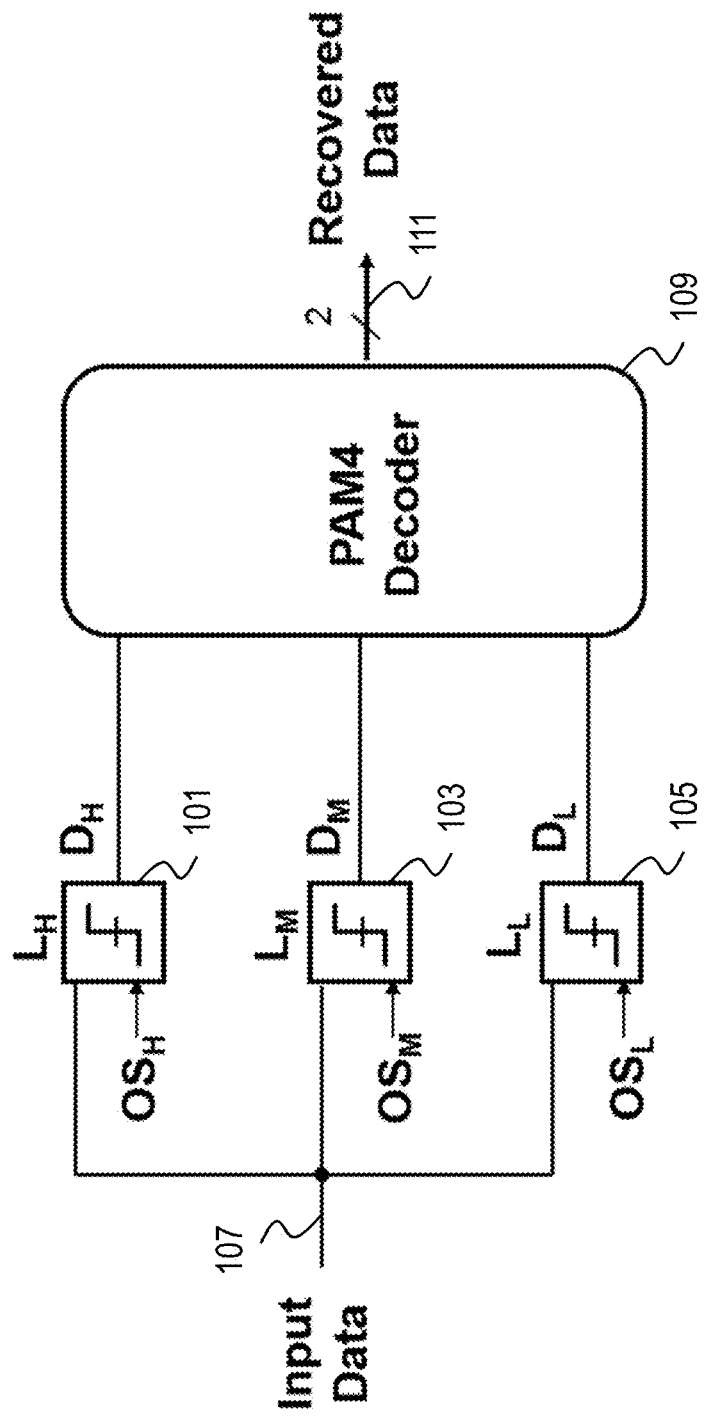
FIG. 1 depicts samplers and decoder configuration employed in a PAM4 serial receiver, according to the prior art.
Figure 2:
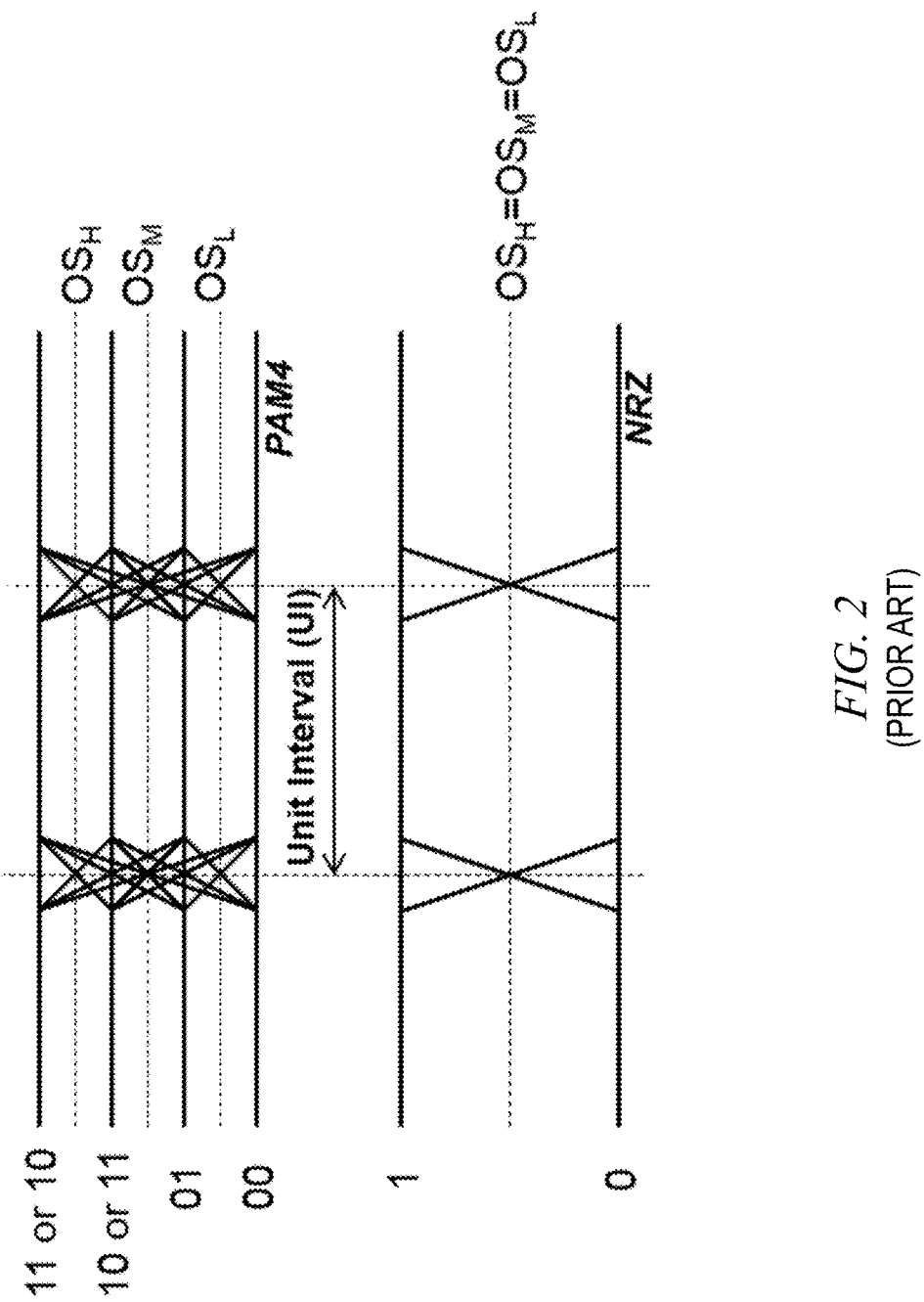
FIG. 2 depicts example eye diagrams for PAM4 encoded data and NRZ data, according to the prior art.

A sampler array in a typical PAM4 receiver is depicted in FIG. 1. The array includes samplers $L_H$, $L_M$, and $L_L$, numbered, respectively, 101, 103, and 105. The input 107 to these samplers may be coupled to a transmission channel, or to the output of an analog amplifier or equalizer. The samplers are used to detect PAM4 data as depicted in the eye diagram at the top of FIG. 2. The PAM4 eye includes 4 levels representing the 2 bits of data encoded in the symbol (note that the bits '10' and '11' corresponding to the upper two levels of the symbol can be swapped, as in a Gray-encoded scheme, to improve the link bit error rate). Thus, the four levels at the top of FIG. 2 are labelled as 00, 01, 10 or 11, and 11 or 10. The three samplers 101, 103, 105 determine if the received data is above or below offset (or threshold) levels $OS_H$, $OS_M$, and $OS_L$, respectively. These offsets are typically centered (in the absence of imperfections due to random device offsets) between two adjacent levels to maximize the voltage sampling margin. As seen at the top of FIG. 2, $OS_L$ is centered between 00 and 01; $OS_M$ is centered between 01 and either 10 or 11 (depending on if the data is Gray encoded); and $OS_H$ is centered between 10 and 11, or 11 or 10 (again, if Gray encoded data is employed). Consequently, thermometer-encoded 3-bit data is obtained in the decisions $D_H$, $D_M$, and $D_L$ at the output of the samplers. The thermometer-encoded data can then be readily decoded with PAM4 decoder 109 into a 2-bit binary (NRZ) data 111 required for typical binary compute systems.

Offsets can be introduced into the samplers 101, 103, 105 to adjust the slicing levels corresponding to the levels $OS_H$, $OS_M$, and $OS_L$, seen in the PAM4 eye diagram of FIG. 2. This is shown as a second input into the samplers of FIG. 1, although other techniques to introduce these offsets (e.g., in amplifier or equalizer stages prior to the samplers) will be apparent to the skilled artisan, given the teachings herein. Thus, each sampler has, as one input, input 107, and as the other input, the corresponding offset $OS_H$, $OS_M$, and $OS_L$. Embodiments of the present invention are independent of the method or circuit technique by which the offset or slice level adjust is implemented. It should be noted that, in the case of a receiver operating on differential input data, nominally $OS_M=0$ and $OS_H=-OS_L$. Also, in the presence of random sampler input-referred offsets, the offset levels $OS_L$, $OS_M$, and $OS_H$ can be adjusted to compensate for these offsets, again to maximize the voltage sampling margin.

Thus, FIG. 1 depicts samplers and decoder configuration employed in a PAM4 serial receiver; note that all or some of the signals may be differential. Furthermore, FIG. 2 depicts example eye diagrams for PAM4 encoded data (top) and NRZ data (bottom). Dashed lines illustrate optimal positions of sampler offsets (or slicing levels) for proper data detection (not accounting for random offsets in the circuitry, e.g. due to device mismatch). The PAM4 and NRZ signals are assumed to have the same symbol rate and unit interval (UI), while the PAM4 signal achieves twice the data rate of the NRZ signal by encoding 2 bits per symbol. In the eye diagram for the NRZ data, note that there are only two possible levels, 0 and 1, and $OS_L=OS_M=OS_H$.

Figure 3:
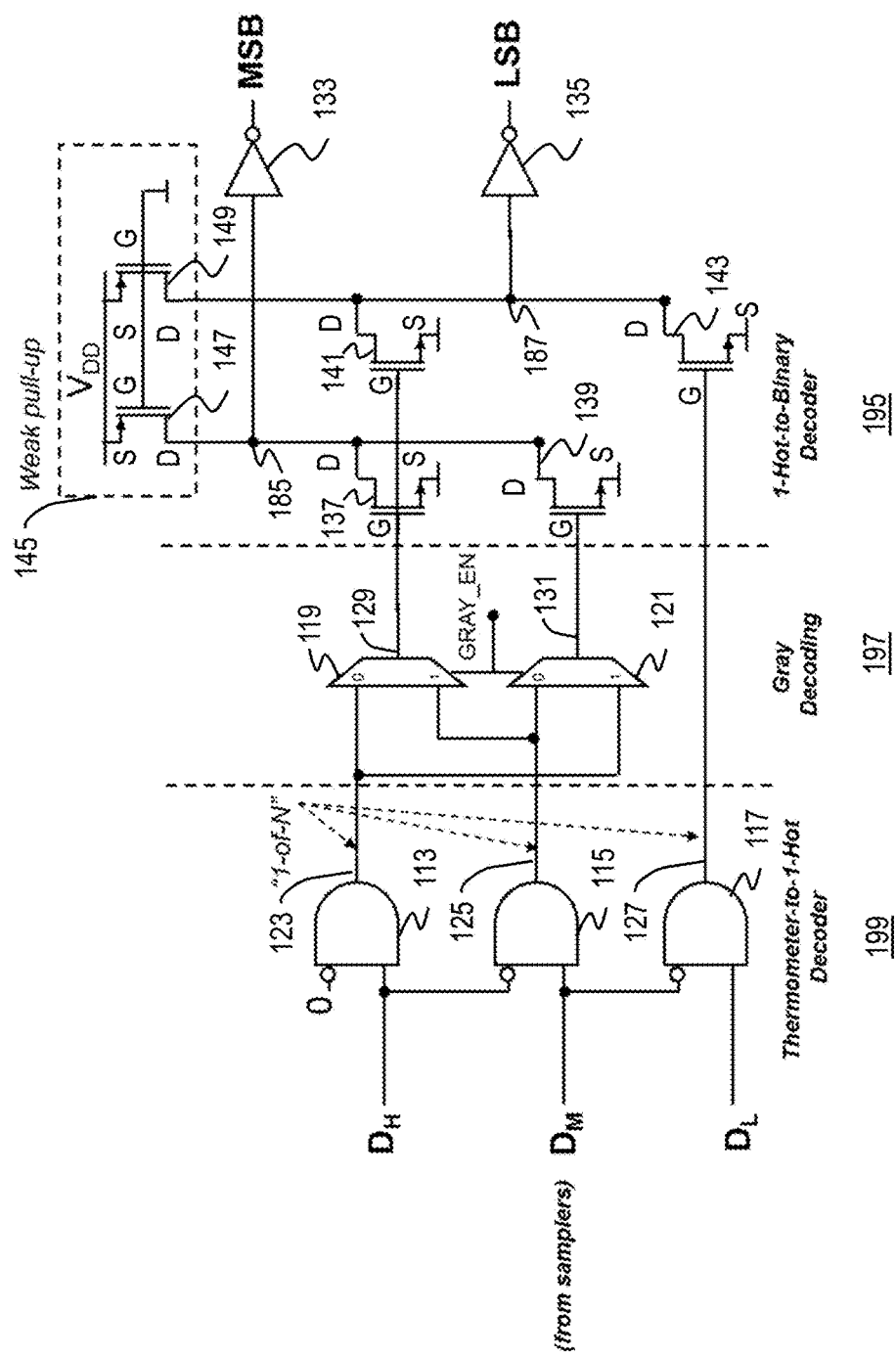
FIG. 3 depicts an exemplary implementation of the 'PAM4 decoder' block of FIG. 1, according to the prior art.

One possible PAM4 decoder implementation, which follows well-known Flash ADC decoder architectures, is depicted in FIG. 3. Note that FIG. 3 depicts a single-ended representation, but it is understood that all or some of the nodes in the schematic (including inputs $D_H$, $D_M$, and $D_L$) can be implemented in a differential fashion. In the decoder, the thermometer encoded data decisions $D_H$, $D_M$, and $D_L$ from the PAM4 data samplers 101, 103, 105 of FIG. 1 are applied to a combinational logic network that implements three functions. The first function 199 (implemented using AND gates 113, 115, 117 in FIG. 3) is to decode the thermometer-encoded data into a '1-hot' or '1-of-N' encoding scheme where only one of the signals out of the AND gates is expected to be logically high at a given time. This function is achieved by detecting the transition point between two adjacent decisions where the lower decision is a logic '1' and the upper decision is a logic '0'. In particular, AND gate 113 has the inverted input as a logical zero and the other input as $D_H$; AND gate 115 has the inverted input as $D_H$ and the other input as $D_M$; and the AND gate 117 has the inverted input as $D_M$ and the other input as $D_L$. Note that for illustrative clarity and simplicity in the figures, the schematics shown are single-ended (consequently, the AND gates in FIG. 3 are provided with inverting inputs as just described). It is to be understood, however, that implementations using differential signaling could be implemented by the skilled artisan, given the teachings herein. In such a case, the logical inversions just discussed are obtained somewhat "for free," since the samplers in such an embodiment produce both true and complimentary data decisions. Thus, in a differential signaling embodiment, the complementary signal from a preceding gate could be provided to a non-inverting input located where the inverting inputs are shown in the figure.

The outputs 123, 125, 127 of the AND gates 113, 115, 117 in FIG. 3 are fed to a network 197 of digital selectors 119, 121 which act to swap the outputs 123, 125 of the two upper AND gates 113, 115 when the PAM4 signal employs GRAY encoding (when signal GRAY_EN=1). In particular, each digital selector 119, 121 has the outputs 123, 125 of both AND gates 113, 115 as inputs. When GRAY_EN=0, digital selector 119 has as its output 129 the output 123 of AND gate 113 and digital selector 121 has as its output 131 the output 125 of AND gate 115. When GRAY_EN=1, digital selector 119 has as its output 129 the output 125 of AND gate 115 and digital selector 121 has as its output 131 the output 123 of AND gate 113.

Finally, the 1-hot-encoded data is decoded to 2-bit binary data using a look-up table implemented with wired-OR logic 195. The active line in the 1-hot-encoded data activates NFET pull-down devices on both the MSB (most significant bit) and LSB (least significant bit) data. In particular, a logical one on the output 129 of digital selector 119 will turn NFETS 137 and 141 on, causing them to conduct to ground; a logical one on the output 131 of digital selector 121 will turn NFET 139 on, causing it to conduct to ground; and a logical one on the output 127 of AND gate 117 will turn NFET 143 on, causing it to conduct to ground; otherwise, the "weak" pull up circuitry 145, including PFETS 147 and 149, pulls the voltage of the input nodes 185, 187 to the inverters 133, 135 up to VDD.

It should be noted that transistors 137 or 139 being turned on will result in a '1' bit being output from the most significant bit (MSB) output of the decoder. If the MSB of the received PAM4 data symbol is '0', no NFET will trigger the corresponding MSB output, but the PFET pull-up device 147 will result in a '0' bit being output from the MSB output of the decoder. Likewise, transistors 141 or 143 being turned on will result in a '1' bit being output from the least significant bit (LSB) output of the decoder. If the LSB of the received PAM4 data symbol is '0', no NFET will trigger the corresponding LSB output, but the PFET pull-up device 149 will result in a '0' bit being output from the LSB output of the decoder. The pull-up devices are understood to be 'weak' such that the pull-down action of the NFETs will overpower the pull-up action of the PFETs. Implementations using other pull-up devices such as resistors are possible.

In a standard manner, "FET"=Field Effect Transistor, NFET=n-type FET, and PFET=p-type FET. The circuits used in one or more embodiments can be implemented using any logic family, with any type of transistor. For example, a skilled artisan, give the teachings herein, could come up with implementations of the samplers/slicers, the majority vote detector, the PAM4 decoder, and circuitry to merge the two paths (NRZ and PAM4 decoded outputs) using emitter coupled logic in a bipolar junction transistor (BJT) or similar technology. Embodiments are thus not limited to a given semiconductor technology, transistor structure, etc.; MOS-FETs, other types of FETs, BJTs, and the like can all be employed as appropriate. Even in complementary metal-oxide semiconductor (CMOS) technology, there are techniques to implement equivalent circuits using only n-type devices (and resistors as appropriate).

The data is then inverted using standard inverters 133, 135, and the binary data is properly recovered. While the implementation is shown as a pure combinational logic network, it is understood that latches or flip-flops can be inserted within this network to improve digital timing margins without changing the intended functionality of the decoder.

FIG. 3 is thus an exemplary implementation of the 'PAM4 decoder' block 109 of FIG. 1. The logic circuit decodes the thermometer encoded data from the output of the samplers to 2-bit binary data.

The samplers' offset levels of FIG. 1 can be modified to support detection of NRZ data. As seen in the NRZ eye diagram at the bottom of FIG. 2, the decision threshold can be placed equally between the high ('1') and low ('0') levels. Therefore, all sampler offset/slice levels can be set equal (although in practice there may be variations in the offsets if they also include a term to compensate for random input-referred sampler offsets as mentioned above). Setting the offsets in this manner will nominally result in all data decisions $D_H$, $D_M$, and $D_L$ to be equal. Consequently, the only AND gate in the decoder of FIG. 3 that can possibly detect a '1' to '0' transition (as described above) is the top AND gate 113 that has one input hard-wired to zero. This implies that only the decision $D_H$ from sampler $L_H$ is used to make a binary data decision when the receiver is detecting NRZ data. Information from the other samplers $L_M$ and $L_L$ is at best unused, and at worst could result in bubble errors in the decoder circuit and degrade the receiver bit error rate. This is just one example of a decoder circuit for this application. While others exist, they inevitably rely on the decision from one sampler (usually either $L_H$ or $L_M$) to make a binary data decision when detecting NRZ data. This is a significant drawback to the prior art. All analog sampling circuits have limited sensitivity, due to internal thermal noise, limited offset compensation resolution, and other mechanisms. The limited sensitivity of the samplers can impact the overall link performance, which is particularly pertinent in optical applications where high-sensitivity receivers are often needed to overcome optical losses in the link.

Figure 4:
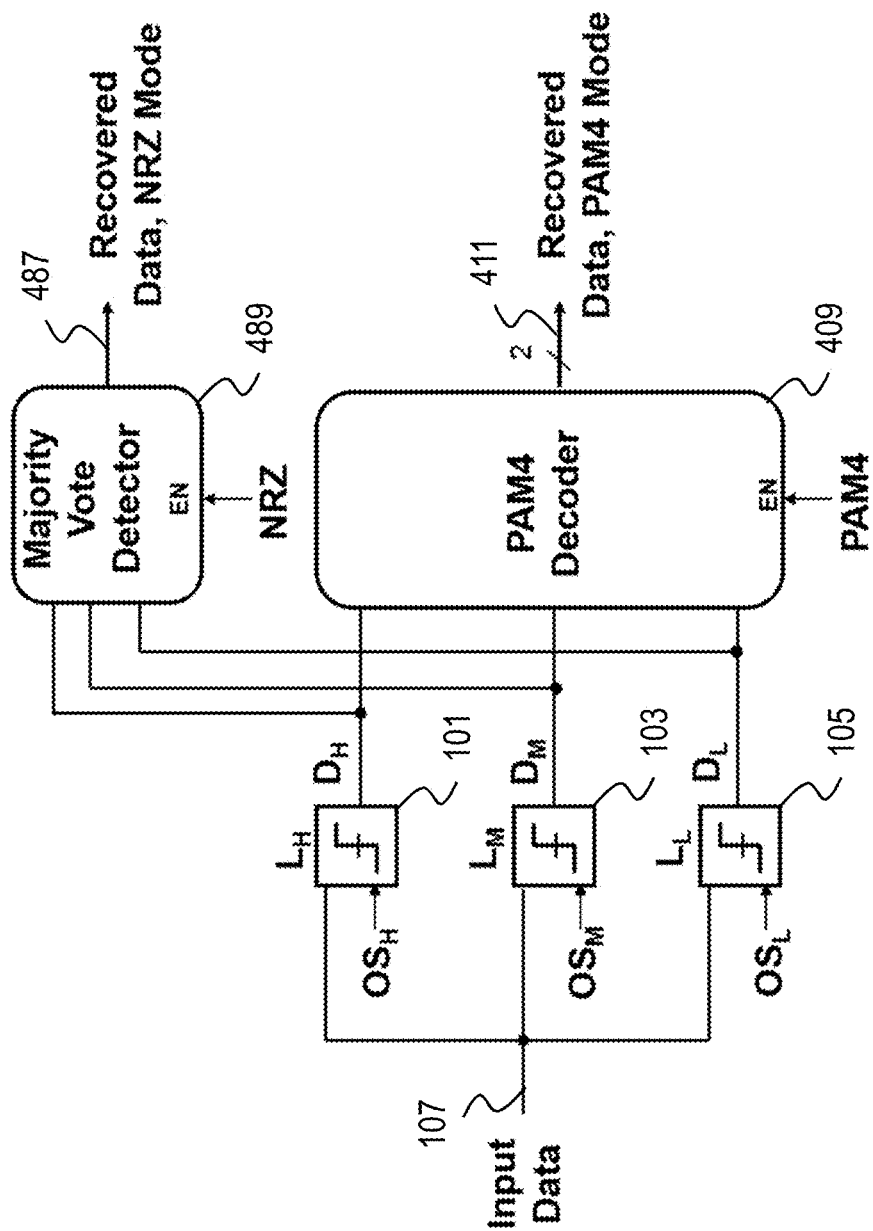
FIG. 4 depicts an exemplary embodiment where a majority vote detector is used to read the output of all three samplers when the receiver is operating in an NRZ mode, in accordance with an aspect of the invention.

One or more embodiments of the present invention advantageously alleviate the limitations described above by using information from all three samplers when detecting NRZ data. The receiver concept is depicted in FIG. 4, where a 'majority vote' circuit 489 is used to read the output decisions from all three samplers 101, 103, 105 when the receiver is operating in an NRZ mode to detect NRZ input data. The majority vote circuit 489 produces an output data decision 487 based on the decision made by at least two of the data samplers. In doing so, erroneous data decisions due to uncorrelated errors from the samplers (e.g., sampler thermal noise) can be reduced. It may be helpful to the skilled artisan to view this concept as akin to using a sampler with larger transistor sizes (e.g., gate widths), a technique commonly employed to reduce transistor thermal noise. However since the three samplers 101, 103, 105 are already employed for PAM4 data detection, the size of a single sampler does not need to be increased. While FIG. 4 shows separate blocks to implement the majority vote detector 489 (with output 487) and the PAM4 decoder 409 (with output 411), it is possible to implement the two with some amount of shared hardware as will be shown in an exemplary implementation described below.

FIG. 4 thus depicts an embodiment wherein a majority vote detector 489 is used to read the output of all three samplers 101, 103, 105 when the receiver is operating in an NRZ mode. The receiver will operate in an NRZ mode when an enable signal is applied to the enable port of the majority vote detector 489. The receiver will operate in a PAM4 mode when an enable signal is applied to the enable port of the PAM4 decoder 409.

The truth table for the majority vote circuit 489, including the enable signal EN, is shown in the table of FIG. 5. The enable signal referred to here is that for the majority vote detector 489, labeled NRZ. If the enable signal EN is low ('0' because in PAM4 not NRZ mode), the output Z corresponding to 487 is either low or in a high-impedance state, depending on the implementation and requirements of the circuits driven by the output of the majority vote circuit. If enable signal EN is high ('1' because in NRZ not PAM4 mode), the output Z is equal to the logic state of the majority (2 or all 3) of the inputs $D_L$, $D_M$, and $D_H$. In one or more embodiments, NRZ_EN and PAM4_EN are complementary; if desired, a single signal can be employed with its true and complement made available. Thus, in normal operation of one or more embodiments, the receiver is in either NRZ mode or PAM4 mode but not both. In a built-in self-test (BIST) mode, for example, neither mode might be enabled.

Figure 6:
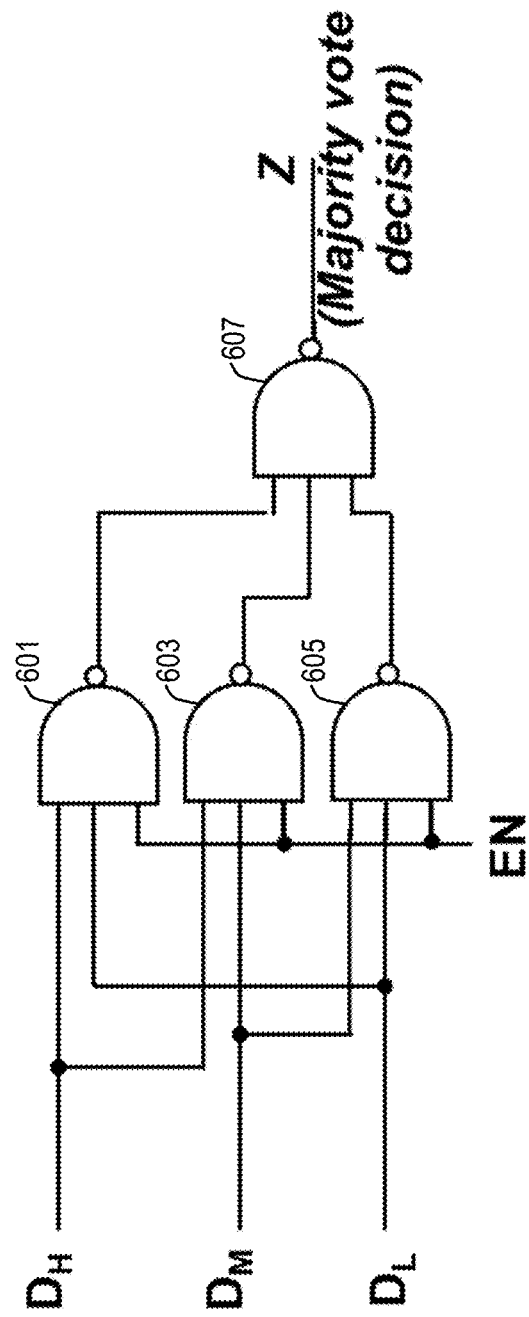
FIG. 6 shows one possible exemplary implementation of the majority vote circuit which can be used in the inventive embodiment of FIG. 4.
Figure 7:
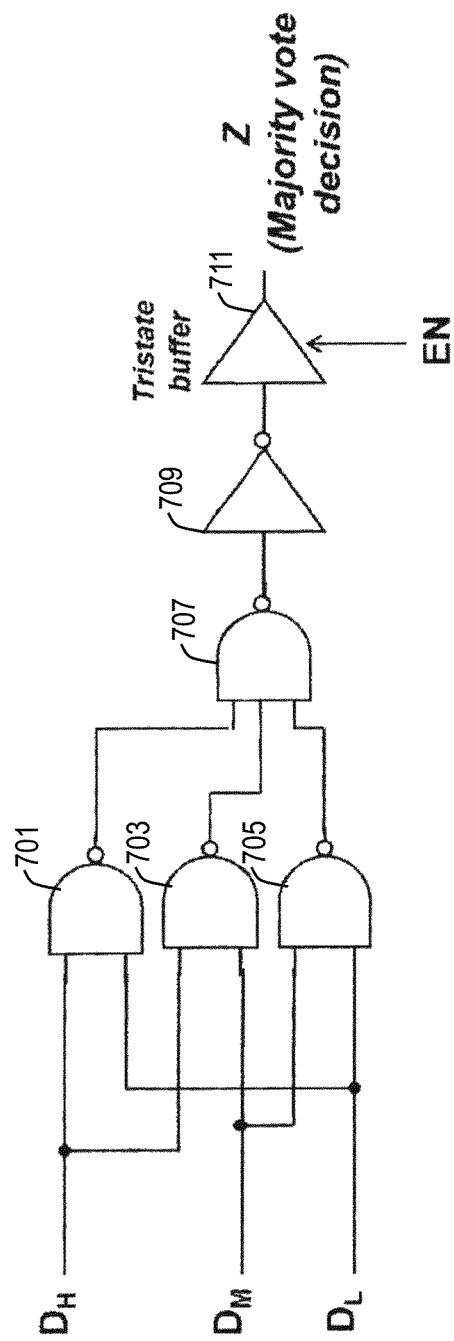
FIG. 7 depicts another possible exemplary implementation of the majority vote circuit which can be used in the inventive embodiment of FIG. 4, where the output is in a high impedance state when EN is low.

Two possible implementations for the majority vote circuit are shown in FIGS. 6 and 7 respectively. In FIG. 6, the first column of NAND gates 601, 603, 605 are each fed by two of the three inputs, as well as the EN signal. In particular, NAND gate 601 is fed by $D_H$, $D_L$, and EN; NAND gate 603 is fed by $D_H$, $D_M$, and EN; and NAND gate 605 is fed by $D_M$, $D_L$, and EN. When the signal EN is high, these NAND gates 601, 603, 605 produce a zero when both of their respective data inputs are high. The final NAND gate 607 reads the outputs of the first column of NAND gates, and produces a one when any of the first set of NAND gates is high. When the enable is low, the output Z is low as well.

The implementation of FIG. 7 operates in a similar fashion, with the exception that the EN signal is applied to the enable of a tri-state buffer 711. In FIG. 7, the first column of NAND gates 701, 703, 705 are each fed by two of the three inputs. In particular, NAND gate 701 is fed by $D_H$ and $D_L$; NAND gate 703 is fed by $D_H$ and $D_M$; and NAND gate 705 is fed by $D_M$ and $D_L$. These NAND gates 701, 703, 705 produce a zero when both of their respective data inputs are high. The final NAND gate 707 reads the outputs of the first column of NAND gates, and produces a one when any of the first set of NAND gates is high. The output of the final NAND gate 707 is inverted in inverter 709 and input to tri-state buffer 711. If the EN signal is low, the output Z of the majority vote detector is in a high-impedance state. Otherwise (EN high), the output Z of the majority vote detector is equal to the input of the tri-state buffer 711 in accordance with the truth table of FIG. 5. Other circuit configurations to implementation the majority vote logic function are possible.

Figure 8:
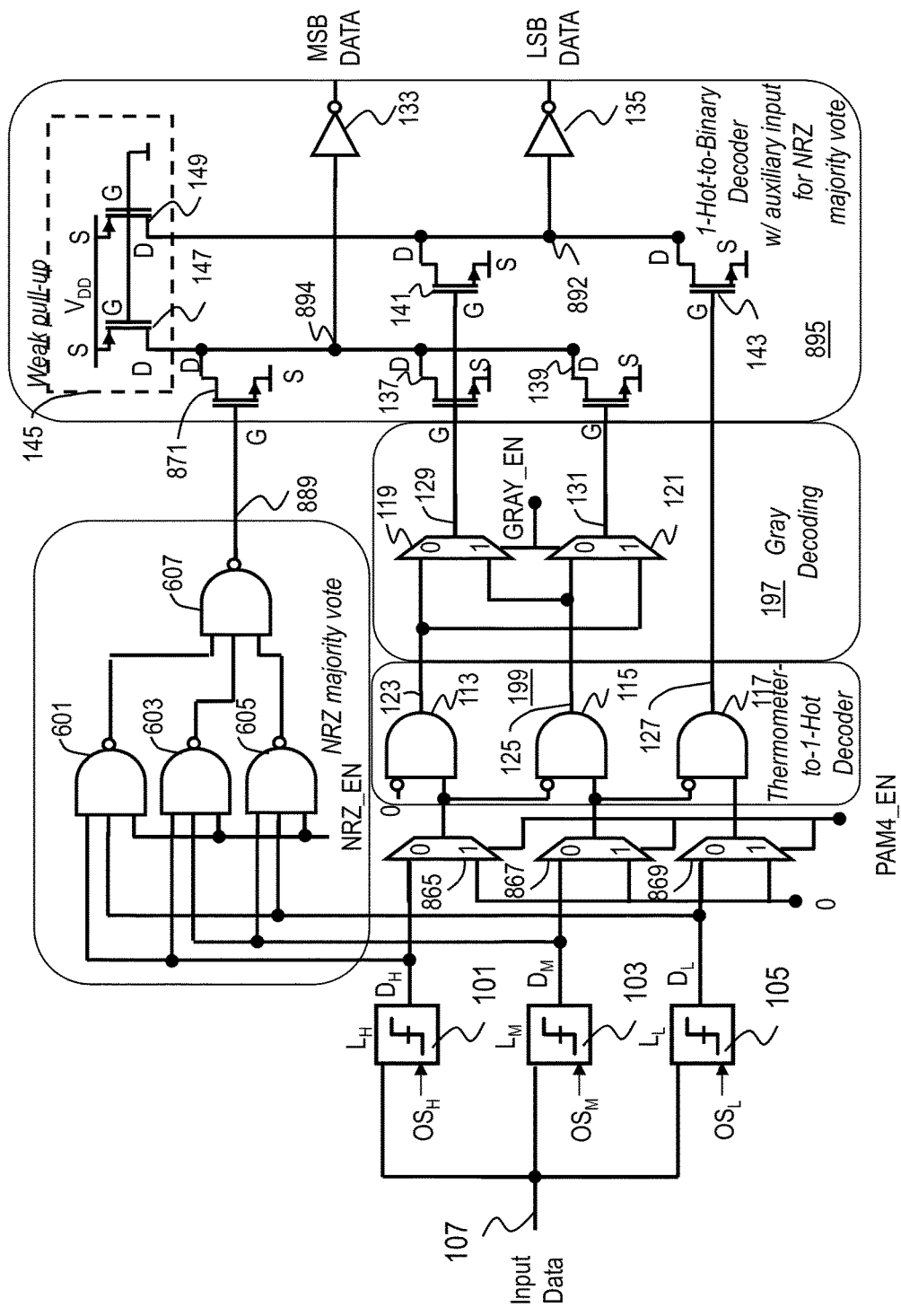
FIG. 8 depicts one possible implementation where the majority vote detector output is coupled into the PAM4 decoder, in accordance with an aspect of the invention.

FIG. 8 shows a possible implementation where the output of the majority vote circuit is coupled into a node within the PAM4 decoder circuit. The implementation builds on FIGS. 3 and 6. The outputs of the three samplers 101, 103, 105 are coupled to the inputs of the majority vote detector (as there are in FIG. 6 as well). The outputs of the three samplers 101, 103, 105 are coupled to selectors (or multiplexers) 865, 867, 869 at the input of the thermometer-to-1-hot encoder 199. These selectors provide a mechanism for disabling the PAM4 decoder functionality by setting all inputs to the PAM4 decoder to a logic '0' when the receiver is not operating in a PAM4 mode. In particular, when signal PAM4_EN is high, selectors (or multiplexers) 865, 867, 869 simply provide the outputs of the three samplers 101, 103, 105 to the inputs of the AND gates 113, 115, 117, while when signal PAM4_EN is low, selectors (or multiplexers) 865, 867, 869 provide a logic '0' to the inputs of the AND gates 113, 115, 117. The output 889 of the majority vote detector is coupled to an auxiliary input in the wired-OR 1-hot-to-binary decoder (re-numbered here as 895 because of changes from 195). The exemplary embodiment in FIG. 8 shows this output 889 of the majority vote detector coupled into the branch 894 of decoder 895 that produces the MSB data, via NFET 871, but alternatively it could be coupled into the other branch 892 producing the LSB data. Coupling to the LSB data output branch 892, where implemented, could also be via an NFET, similar to NFET 871. Furthermore in this regard, in one or more embodiments, in NRZ mode, the receiver looks at MSB data or LSB data; in the example of FIG. 8, the NRZ data comes out of the MSB output but it could instead be pulled out of the LSB output by coupling output 889 into the LSB branch as described.

In the figures, the transistor labels "G," "D," and "S" refer to the FET gate, drain, and source, in a standard manner.

Other decoding schemes are possible, as would be evident to one skilled in the art, given the teachings herein. A pertinent aspect of one or more embodiments of the present invention is the coupling of all data decisions to a majority vote circuit for NRZ data detection. Moreover, for illustrative purposes, the exemplary implementations in the figures assume a 'full-rate' receiver where the three samplers make data decisions on each input symbol. Sub-rate implementations where one bank of three comparators makes a decision on a fraction of the input symbols are also possible. For example, in a half-rate architecture, one bank of samplers would detect the first symbol on the rising edge of a given half-rate clock cycle, while a second bank of samplers would detect the second symbol using the falling edge of a given half-rate clock cycle. In such a half-rate implementation, two instances of the decoder circuit depicted in FIG. 8 would be employed, and the output data would be at half the symbol rate as the input data to the receiver (providing similar functionality to a 1:2 de-multiplexer circuit in addition to the data decoding).

One or more embodiments thus provide techniques for detection of data in a PAM4 receiver, when the receiver is operating in an NRZ mode. By using the data information obtained from the additional samplers (which are required for PAM4 data detection but are not conventionally required for NRZ data detection), one or more embodiments are less susceptible to decision errors made by a single sampler and thus improve the receiver sensitivity when operating in NRZ mode. Indeed, one or more embodiments provide a receiver circuit that can operate on PAM4 or NRZ data.

It should be noted that one or more embodiments are directed to a data detector rather than a phase detector. In one or more embodiments, additional PAM4 samplers are used in NRZ mode (with programmable offsets adjusted as required for NRZ mode instead of PAM4) to provide additional sampling information. This additional information is then fed to a majority voting circuit in order to improve robustness in the presence of decision errors from a single sampler.

In one or more embodiments, a majority vote circuit is used in NRZ mode only, and is used to enhance decisions made by multiple slicers to make the system more robust in the presence of slicer non-idealities.

One or more embodiments make use of three samplers that would (under ideal conditions), operate on the same part of the eye and make the same decision; however, one or more embodiments improve receiver robustness (for a PAM4 receiver, suitable for a PAM4 serial link, operating in an NRZ mode of operation) in the presence of uncorrelated slicer errors (errors in the sampler data decisions) by comparing the output of all three slicers using the majority voting circuit.

One or more embodiments use majority voting to perform data detection and not for extracting timing information. One or more embodiments use a majority voter to make use of the additional data samples (as opposed to edge samples) available in a PAM4 receiver when it is operating in an NRZ mode. One or more embodiments are used to enhance data sampling information, as opposed to edge information, and/or use the information from the extra samplers when operating in NRZ mode.

In one or more embodiments, the three samplers used in NRZ mode are intended to sample at the same point in the eye (both in the horizontal and vertical directions).

One or more embodiments use the majority vote within the I/O (or SERDES) circuitry within a single link, to improve the robustness of that link. In one or more embodiments, the additional samplers already exist within a serializer/deserializer (SERDES) receiver and are re-purposed from PAM4 mode to NRZ mode in order to improve robustness when operating in the NRZ mode. One or more embodiments do not need data or packet buffers between the samplers and the majority voter circuit, and/or do not need handshaking and timing alignment from the sampler to these buffers. Other embodiments could differ. For example, some embodiments could have data buffers but not packet buffers. As used herein, the term "data buffer" is used in the sense of an inverter or logic gate used to increase fan-out in a logic sense, as opposed to a buffer which maintains a large amount of data in reserve (e.g. like registers or analogous to the screen buffer on a computer).

Figure 9:
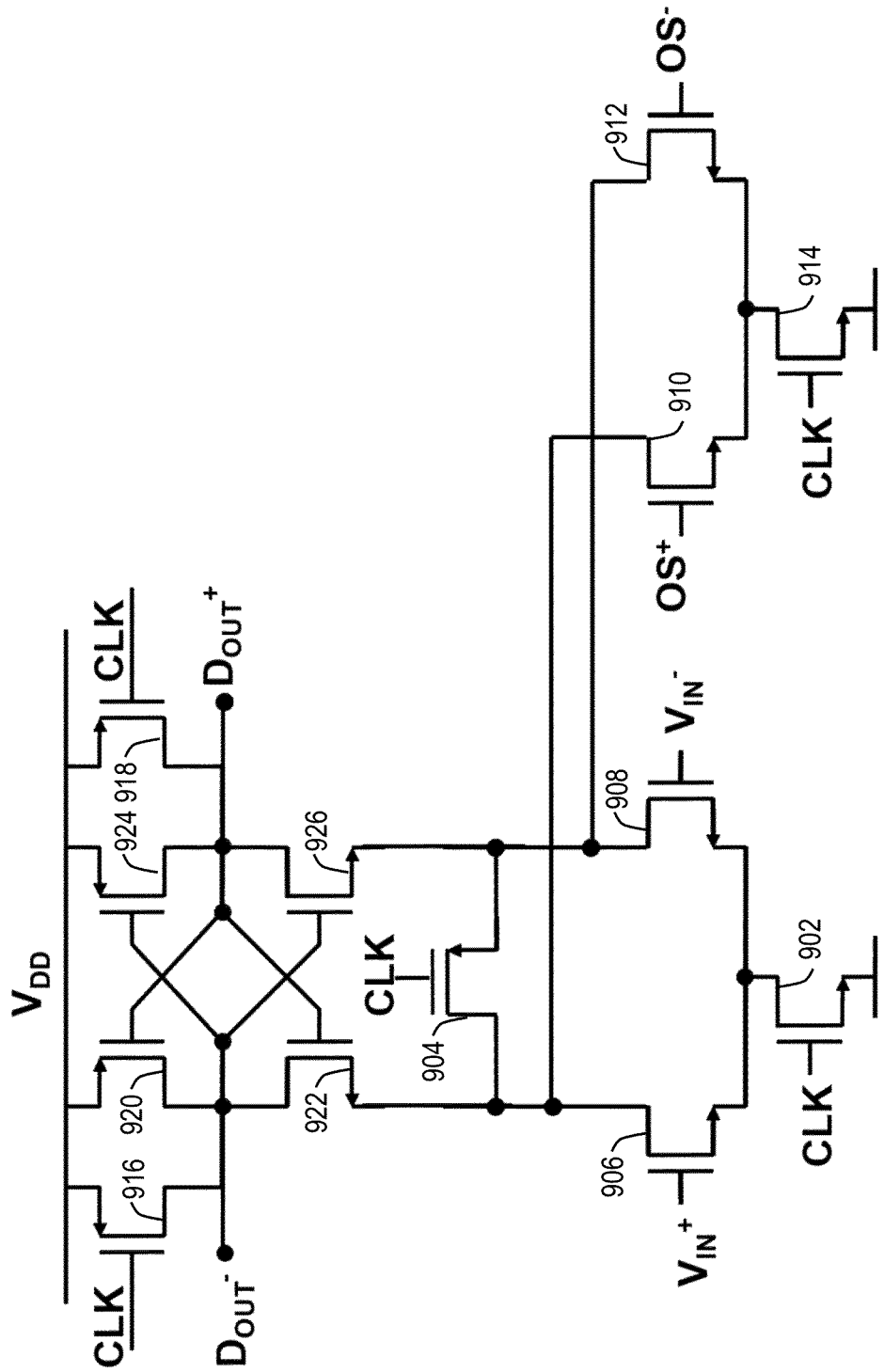
FIG. 9 shows an exemplary implementation of samplers with an auxiliary input to adjust the slicing level of the sampler, in accordance with an aspect of the invention.

The samplers of FIGS. 4 and 8 can be implemented in a number of ways. One possible approach, commonly referred to as a StrongARM sampler (or latch or sense amplifier latch), is illustrated in FIG. 9. Note the cross-coupled inverters formed by PFETS 920, 924 and NFETs 922, 926. This is a synchronous circuit, and when a clock signal CLK is asserted high on the gates of NFET 902, NFET 914, PFET 916, PFET 918, and PFET 904, the differential sampler structure evaluates the difference in the input voltages $V_{IN}^+$ and $V_{IN}^-$ on the gates of NFETs 906, 908 and produces a binary differential data decision at the outputs $D_{OUT}^+$ and $D_{OUT}^-$. When the CLK signal is low, the sampler enters a reset phase where the differential outputs are pre-charged to the supply voltage $V_{DD}$. Consequently, the output data decisions are commonly fed to another synchronous latch to store the decision. An offset is applied through an auxiliary differential NFET pair 910, 912 in parallel with the primary input. This auxiliary pair is driven by a programmable differential voltage OS+ and OS− applied to the gates, which could be provided, for example, by one or more digital-to-analog converters (DACs) that produce voltage outputs. The programmability of this offset voltage ensures that the slicing levels of the sampler can be reconfigured as required for PAM4 or NRZ data recovery (as seen from the desired slicing levels in the eye diagrams of FIG. 2). Other possible implementations of slicer circuits (either synchronous or asynchronous) and/or techniques for generating programmable offset voltages for the slicer will be apparent to a skilled artisan, given the teachings herein.

Figure 10:
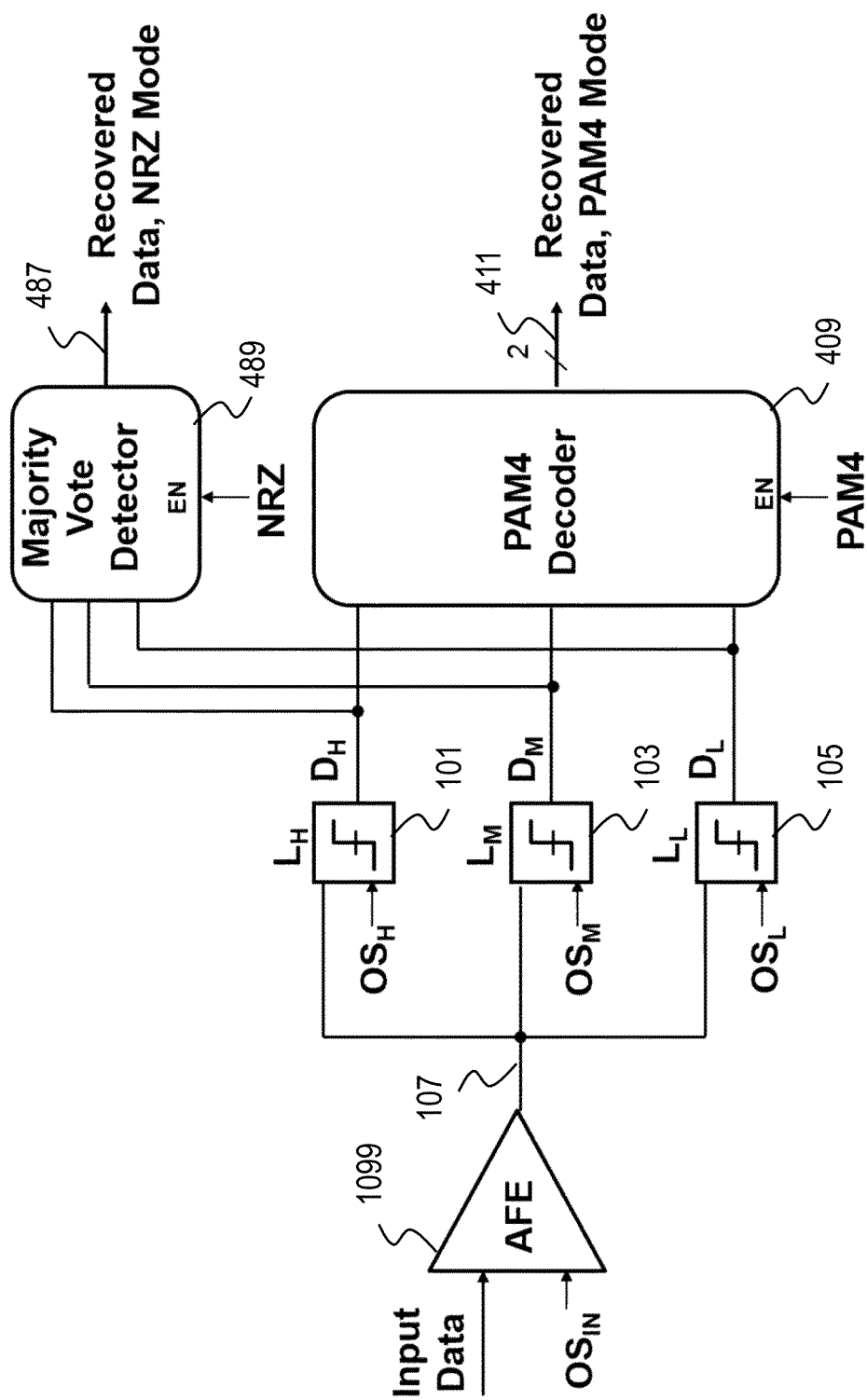
FIG. 10 shows an alternative embodiment where the serial receiver includes an analog front end (AFE) with input-referred offset correction, in accordance with an aspect of the invention.

Embodiments of the invention improve receiver sensitivity in the presence of uncorrelated errors associated with the samplers (e.g. noise or offsets). Correlated errors can arise from imperfections in the input data waveform applied to the samplers. This can be the result of circuit imperfections in the transmitter, in the receiver 'analog front end' (AFE), or both. In serial receivers, the AFE commonly includes one or more analog amplifiers and/or equalizers that boost the signal-to-noise ratio (SNR) before data decisions are made by the samplers. It may also include an input impedance matching network (sometimes called a termination network) to ensure that the input return losses are minimized to avoid signal reflections back into the transmission channel. As applied to one or more embodiments, an AFE 1099 precedes the three samplers as shown in FIG. 10. The AFE will introduce an input-referred offset voltage which, if left uncorrected, would represent an uncorrelated error that would influence data decisions made by all three samplers.

This offset could be corrected by applying a correction signal $OS_{IN}$, also seen in FIG. 10. The sign and magnitude of this correction signal can be determined in situ through well know techniques such as analog dc offset correction feedback loops (not shown in FIG. 10 to avoid clutter). The input data 107 of FIG. 1 is, in FIG. 10, the output of AFE 1099; AFE input data is one of the inputs to AFE 1099 (correction signal $OS_{IN}$ is the other).

Figure 11:
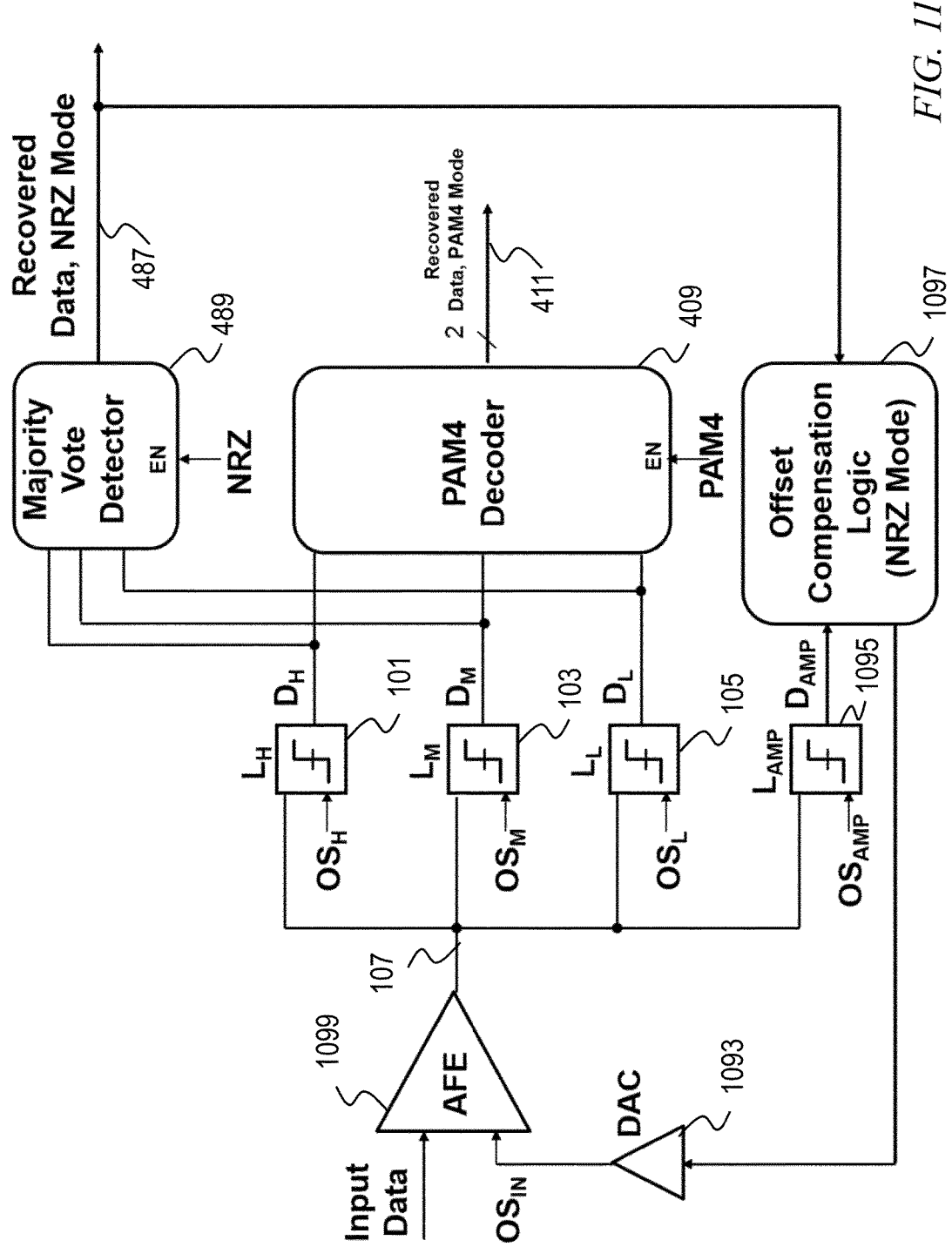
FIG. 11 shows another alternative embodiment where the serial receiver includes an analog front end (AFE) with input-referred offset correction, with the amount of offset correction required determined through a mixed-signal feedback loop that makes use of an amplitude sampler (or eye monitor), in accordance with an aspect of the invention.

Other techniques for correcting the input referred offset are possible; for example, a mixed-signal feedback loop as shown in FIG. 11. Here, the aim of the offset correction loop is to measure the amplitude of a received '1' data bit as well as the amplitude of a received '0' data bit, and to balance the two by adjusting the $OS_{IN}$ offset correction. The amplitude is measured through the use of an auxiliary amplitude sampler 1095 (sometimes referred to as an eye monitor), which adjusts its own slicing level through an $OS_{AMP}$ offset signal. The output of this amplitude sampler 1095 can be fed to a logic macro or state machine (labeled 'Offset Compensation Logic' 1097 in FIG. 11) that aims to measure the amplitudes of the '1' and '0' levels, and adjust the value of $OS_{IN}$ to balance the two, thereby removing any offset arising from the AFE, as well as any offset inherent in the data at the input of the AFE (for example, due to offsets in the transmitter). The amplitude measurements may be determined through the use of a conventional sign-sign least-mean squared (SS-LMS) algorithm, where the output of the amplitude sampler generates the error signal used by the algorithm. In this case, data decisions from the amplitude sampler are qualified by actual data decisions that arise from the three primary data samplers. This qualification ensures that, for example, information collected about the amplitude of the '1' level is only updated when a '1' bit was actually received. Consequently, recovered data from the output of the majority vote detector is also passed to the logic. Without loss of generality, the measured amplitude of the '1' and '0' levels may refer to the average value of these levels, or the minimum or maximum value of these levels, all of which can be determined through a SS-LMS algorithm as would be appreciated by one skilled in the art. In the embodiment of FIG. 11, the offset compensation logic sends a digital code to a digital to analog converter (DAC) 1093, which in turn produces the analog $OS_{IN}$ signal required to compensate the receiver input referred offset. It is understood that $OS_{IN}$ could take the form of an analog voltage or current, depending on how the offset compensation is implemented within the AFE. Furthermore, the offset level $OS_{AMP}$ is used to determine the amplitude of the '1' or '0'.

Other decoding schemes are possible, as will be evident to one skilled in the art, given the teachings herein. A pertinent aspect of one or more embodiments of the invention is the coupling of all data decisions to a majority vote circuit for NRZ data detection. Moreover, the diagrams disclosed all assume a 'full-rate' receiver where the three samplers make data decisions on each input symbol. Sub-rate implementations where one bank of three comparators makes a decision on a fraction of the input symbols are also possible. For example, in a half-rate architecture, one bank of samplers detects the first symbol on the rising edge of a given half-rate clock cycle, while a second bank of samplers detects the second symbol using the falling edge of a given half-rate clock cycle.

Given the discussion thus far, it will be appreciated that an exemplary four-level pulse amplitude modulation receiver with a four-level pulse amplitude modulation mode and a non-return-to-zero modulation mode, according to an aspect of the invention, includes an input 107, and first, second, and third four-level pulse amplitude modulation samplers 101, 103, 105 coupled to the input. Each of the first, second, and third four-level pulse amplitude modulation samplers has a corresponding output in turn including a corresponding binary decision of the first, second, and third samplers ($D_H$, $D_M$, $D_L$, respectively). The receiver further includes a four-level pulse amplitude modulation decoder circuit 409, 199/197/895 having inputs coupled to the outputs of the first, second, and third four-level pulse amplitude modulation samplers (e.g. by multiplexers 865, 867, 869). The four-level pulse amplitude modulation decoder circuit is active in the four-level pulse amplitude modulation mode (but typically not in the NRZ mode). The receiver even further includes a non-return-to-zero majority voting circuit 489 (with details as in, e.g., FIG. 6 or FIG. 7) coupled to the outputs of the first, second, and third four-level pulse amplitude modulation samplers. A variety of coupling schemes could be employed; in some cases, coupling is effectively enabled by the NRZ_EN signal; in other cases, a multiplexer at the inputs could be employed to select the data $D_H$, $D_M$, or $D_L$, with the multiplexer selecting a hard-wired zero when not in the NRZ mode. In such an alternative, two-input as opposed to three-input gates could be employed, with the NRZ_EN signal moved to the multiplexer. The non-return-to-zero majority voting circuit has an output and is configured to output a majority decision of the corresponding binary decisions of the first, second, and third samplers (e.g., in accordance with the logic table of FIG. 5). The non-return-to-zero majority voting circuit is active in NRZ mode (but typically not in the PAM4 mode).

Some embodiments further include an offset-compensated analog front end 1099 having an output coupled to the input 107 and having a correction signal input ($OS_{IN}$) and an analog front end input (AFE Input Data). Some such embodiments further include an auxiliary amplitude sampler 1095 coupled to the input, and having an output; offset compensation logic 1097 coupled to the output of the auxiliary amplitude sampler and the output of the non-return-to-zero majority voting circuit; and a digital to analog converter 1093 between the offset compensation logic and the correction signal input.

In some cases (e.g., as in FIG. 8), the four-level pulse amplitude modulation decoder circuit and the non-return-to-zero majority voting circuit are implemented in shared hardware.

In some cases, as seen in FIG. 6, the non-return-to-zero majority voting circuit includes a first NAND gate 601 having a first input coupled to the output $D_H$ of the first four-level pulse amplitude modulation sampler, a second input coupled to the output $D_L$ of the third four-level pulse amplitude modulation sampler, a third input coupled to an enable signal source EN (or more specifically NRZ_EN), and an output. The non-return-to-zero majority voting circuit also includes a second NAND gate 603 having a first input coupled to the output $D_H$ of the first four-level pulse amplitude modulation sampler, a second input coupled to the output $D_M$ of the second four-level pulse amplitude modulation sampler, a third input coupled to the enable signal source EN (or more specifically NRZ_EN), and an output; and still further includes a third NAND gate 605 having a first input coupled to the output $D_M$ of the second four-level pulse amplitude modulation sampler, a second input coupled to the output $D_L$ of the third four-level pulse amplitude modulation sampler, a third input coupled to the enable signal source EN (or more specifically NRZ_EN), and an output. The non-return-to-zero majority voting circuit still further includes a fourth NAND gate 607 having first, second and third inputs coupled respectively to the outputs of the first, second, and third NAND gates, and an output that outputs the majority decision Z of the corresponding binary decisions of the first, second, and third samplers when the enable signal source EN (or more specifically NRZ_EN) enables the first, second, and third NAND gates.

In some cases, as seen in FIG. 7, the non-return-to-zero majority voting circuit includes a first NAND gate 701 having a first input coupled to the output $D_H$ of the first four-level pulse amplitude modulation sampler, a second input coupled to the output $D_L$ of the third four-level pulse amplitude modulation sampler, and an output; a second NAND gate 703 having a first input coupled to the output $D_H$ of the first four-level pulse amplitude modulation sampler, a second input coupled to the output $D_M$ of the second four-level pulse amplitude modulation sampler, and an output; and a third NAND gate 705 having a first input coupled to the output $D_M$ of the second four-level pulse amplitude modulation sampler, a second input coupled to the output $D_L$ of the third four-level pulse amplitude modulation sampler, and an output. The non-return-to-zero majority voting circuit includes a fourth NAND gate 707 having first, second and third inputs coupled respectively to the outputs of the first, second, and third NAND gates 701, 703, 705, and an output; an inverter 709 having an input coupled to the output of the fourth NAND gate; and a tri-state buffer 711 having an enable input EN (or more specifically NRZ_EN), a data input coupled to the output of the inverter 709, and an output that outputs the majority decision Z of the corresponding binary decisions of the first, second, and third samplers when enabled by the enable input EN (or more specifically NRZ_EN).

Referring to FIGS. 3 and 8, in some instances, the four-level pulse amplitude modulation decoder circuit includes a thermometer-to-one-hot decoder circuit 199 having the inputs selectively coupled to the outputs $D_H$, $D_M$, $D_L$ of the first, second, and third four-level pulse amplitude modulation samplers; and a one-hot-to-binary decoder circuit 195, 895 coupled to the thermometer-to-one-hot decoder circuit 199 and having a most significant bit output (MSB output of inverter 133) and a least significant bit output (LSB output of inverter 135). In some such instances, the four-level pulse amplitude modulation decoder circuit further includes a Gray decoding circuit 197 interposed between the thermometer-to-one-hot decoder circuit and the one-hot-to-binary decoder circuit. As seen, e.g., at 871 in FIG. 8, in some such instances, the one-hot-to-binary decoder circuit 895 further includes an auxiliary input coupled to the non-return-to-zero majority voting circuit (e.g. to the output 889 of the majority vote detector; i.e., output of NAND gate 607)

As alluded to, in some instances, the receiver further includes first, second, and third multiplexers 865, 867, 869 which selectively couple the inputs of the thermometer-to-one-hot decoder circuit 199 to the outputs $D_H$, $D_M$, $D_L$ of the first, second, and third four-level pulse amplitude modulation samplers 101, 103, 105 when a four-level pulse amplitude modulation mode is enabled (e.g. by signal PAM4_EN), and which selectively couple the inputs of the thermometer-to-one-hot decoder circuit 199 to ground when the four-level pulse amplitude modulation mode is not enabled.

In one or more embodiments, the thermometer-to-one-hot decoder circuit 199 includes a first AND gate 113 having a first input coupled to the first multiplexer 865, a second input coupled to ground, and an output 123; a second AND gate 115 having a first input coupled to the first multiplexer 865, a second input coupled to the second multiplexer 867, and an output 125; and a third AND gate 117 having a first input coupled to the second multiplexer 867, a second input coupled to the third multiplexer 869, and an output 127.

In one or more embodiments, the Gray decoding circuit 197 includes a first digital selector 119 having a first input coupled to the output 123 of the first AND gate 113, a second input coupled to the output 125 of the second AND gate 115, a Gray enable input GRAY_EN, and an output 129, as well as a second digital selector 121 having a first input coupled to the output 125 of the second AND gate 115, a second input coupled to the output 123 of the first AND gate 113, a Gray enable input GRAY_EN, and an output 131. When the Gray enable inputs are not enabled, the first input of the first digital selector is coupled to the output of the first digital selector and the first input of the second digital selector is coupled to the output of the second digital selector. On the other hand, when the Gray enable inputs are enabled, the second input of the first digital selector is coupled to the output of the first digital selector and the second input of the second digital selector is coupled to the output of the second digital selector.

In one or more embodiments, the one-hot-to-binary decoder circuit 895 includes a most significant bit branch 894 coupled to the most significant bit output MSB DATA (e.g., through inverter 133); a least significant bit branch 892 coupled to the least significant bit output LSB DATA (e.g., through inverter 135); a first pull up p-type field effect transistor 147 having a source coupled to a supply voltage $V_{DD}$, a grounded gate, and a drain coupled to the most significant bit branch; and a second pull up p-type field effect transistor 149 having a source coupled to the supply voltage $V_{DD}$, a grounded gate, and a drain coupled to the least significant bit branch. The one-hot-to-binary decoder circuit further includes a plurality of pull down n-type field effect transistors 137, 139, 141, 143 coupled to respective ones of the outputs 129, 131 of the first and second digital selectors and the output 127 of the third AND gate 117 to selectively ground the most significant bit branch and the least significant bit branch. One or more embodiments further include an additional pull down n-type field effect transistor 871 providing the aforementioned auxiliary input.

In another aspect, an exemplary method includes operating a four-level pulse amplitude modulation receiver (see. e.g., FIGS. 4 and 8) with a four-level pulse amplitude modulation mode and a non-return-to-zero modulation mode in the non-return-to-zero modulation mode (E.G., NRZ_EN enabled). The four-level pulse amplitude modulation receiver has first, second, and third four-level pulse amplitude modulation samplers 101, 103, 105 coupled to a common input 107. A further step includes, during the operation of the four-level pulse amplitude modulation receiver in the non-return-to-zero modulation mode, feeding outputs $D_H$, $D_M$, $D_L$ of the first, second, and third samplers to a majority voting circuit 489. The outputs $D_H$, $D_M$, $D_L$ of the first, second, and third samplers are the corresponding binary decisions of the first, second, and third samplers 101, 103, 105. A further step includes outputting, from the majority voting circuit, a majority decision Z of the corresponding binary decisions of the first, second, and third samplers. In some cases, the method further includes providing an input signal to the receiver from an offset-compensated analog front end 1099.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A four-level pulse amplitude modulation receiver with a four-level pulse amplitude modulation mode and a non-return-to-zero modulation mode, said receiver comprising:
   an input;
   first, second, and third four-level pulse amplitude modulation samplers coupled to said input, each of said first, second, and third four-level pulse amplitude modulation samplers having a corresponding output in turn comprising a corresponding binary decision of said first, second, and third samplers;
   a four-level pulse amplitude modulation decoder circuit having inputs coupled to said outputs of said first, second, and third four-level pulse amplitude modulation samplers, said four-level pulse amplitude modulation decoder circuit being active in said four-level pulse amplitude modulation mode; and
   a non-return-to-zero majority voting circuit coupled to said outputs of said first, second, and third four-level pulse amplitude modulation samplers, said non-return-to-zero majority voting circuit having an output and being configured to output a majority decision of said corresponding binary decisions of said first, second, and third samplers, said non-return-to-zero majority voting circuit being active in said non-return-to-zero modulation mode.

2. The receiver of claim 1, further comprising an offset-compensated analog front end having an output coupled to said input and having a correction signal input and an analog front end input.

3. The receiver of claim 2, further comprising:
   an auxiliary amplitude sampler coupled to said input, and having an output;
   offset compensation logic coupled to said output of said auxiliary amplitude sampler and said output of said non-return-to-zero majority voting circuit; and
   a digital to analog converter between said offset compensation logic and said correction signal input.

4. The receiver of claim 1, wherein said four-level pulse amplitude modulation decoder circuit and said non-return-to-zero majority voting circuit are implemented in shared hardware.

5. The receiver of claim 4, wherein said four-level pulse amplitude modulation decoder circuit comprises:

a thermometer-to-one-hot decoder circuit having said inputs selectively coupled to said outputs of said first, second, and third four-level pulse amplitude modulation samplers; and a one-hot-to-binary decoder circuit coupled to said thermometer-to-one-hot decoder circuit and having a most significant bit output and a least significant bit output.

6. The receiver of claim 5, wherein said four-level pulse amplitude modulation decoder circuit further comprises a Gray decoding circuit interposed between said thermometer-to-one-hot decoder circuit and said one-hot-to-binary decoder circuit.

7. The receiver of claim 6, wherein said one-hot-to-binary decoder circuit further comprises an auxiliary input coupled to said non-return-to-zero majority voting circuit.

8. The receiver of claim 7, further comprising first, second, and third multiplexers which selectively couple said inputs of said thermometer-to-one-hot decoder circuit to said outputs of said first, second, and third four-level pulse amplitude modulation samplers when a four-level pulse amplitude modulation mode is enabled, and which selectively couple said inputs of said thermometer-to-one-hot decoder circuit to ground when said four-level pulse amplitude modulation mode is not enabled.

9. The receiver of claim 8, wherein said thermometer-to-one-hot decoder circuit comprises:
a first AND gate having a first input coupled to said first multiplexer, a second input coupled to ground, and an output;
a second AND gate having a first input coupled to said first multiplexer, a second input coupled to said second multiplexer, and an output; and
a third AND gate having a first input coupled to said second multiplexer, a second input coupled to said third multiplexer, and an output.

10. The receiver of claim 9, wherein said Gray decoding circuit comprises:
a first digital selector having a first input coupled to said output of said first AND gate, a second input coupled to said output of said second AND gate, a Gray enable input, and an output; and
a second digital selector having a first input coupled to said output of said second AND gate, a second input coupled to said output of said first AND gate, a Gray enable input, and an output;
wherein:
when said Gray enable inputs are not enabled, said first input of said first digital selector is coupled to said output of said first digital selector and said first input of said second digital selector is coupled to said output of said second digital selector; and
when said Gray enable inputs are enabled, said second input of said first digital selector is coupled to said output of said first digital selector and said second input of said second digital selector is coupled to said output of said second digital selector.

11. The receiver of claim 10, wherein said one-hot-to-binary decoder circuit comprises:
a most significant bit branch coupled to said most significant bit output;
a least significant bit branch coupled to said least significant bit output;
a first pull up p-type field effect transistor having a source coupled to a supply voltage, a grounded gate, and a drain coupled to said most significant bit branch;

a second pull up p-type field effect transistor having a source coupled to said supply voltage, a grounded gate, and a drain coupled to said least significant bit branch; and
a plurality of pull down n-type field effect transistors coupled to respective ones of said outputs of said first and second digital sectors and said output of said third AND gate to selectively ground said most significant bit branch and said least significant bit branch.

12. The receiver of claim 11, further comprising an additional pull down n-type field effect transistor providing said auxiliary input.

13. The receiver of claim 1, wherein said non-return-to-zero majority voting circuit comprises:
a first NAND gate having a first input coupled to said output of said first four-level pulse amplitude modulation sampler, a second input coupled to said output of said third four-level pulse amplitude modulation sampler, a third input coupled to an enable signal source, and an output;
a second NAND gate having a first input coupled to said output of said first four-level pulse amplitude modulation sampler, a second input coupled to said output of said second four-level pulse amplitude modulation sampler, a third input coupled to said enable signal source, and an output;
a third NAND gate having a first input coupled to said output of said second four-level pulse amplitude modulation sampler, a second input coupled to said output of said third four-level pulse amplitude modulation sampler, a third input coupled to said enable signal source, and an output; and
a fourth NAND gate having first, second and third inputs coupled respectively to said outputs of said first, second, and third NAND gates, and an output that outputs said majority decision of said corresponding binary decisions of said first, second, and third samplers when said enable signal source enables said first, second, and third NAND gates.

14. The receiver of claim 1, wherein said non-return-to-zero majority voting circuit comprises:
a first NAND gate having a first input coupled to said output of said first four-level pulse amplitude modulation sampler, a second input coupled to said output of said third four-level pulse amplitude modulation sampler, and an output;
a second NAND gate having a first input coupled to said output of said first four-level pulse amplitude modulation sampler, a second input coupled to said output of said second four-level pulse amplitude modulation sampler, and an output;
a third NAND gate having a first input coupled to said output of said second four-level pulse amplitude modulation sampler, a second input coupled to said output of said third four-level pulse amplitude modulation sampler, and an output;
a fourth NAND gate having first, second and third inputs coupled respectively to said outputs of said first, second, and third NAND gates, and an output;
an inverter having an input coupled to said output of said fourth AND gate; and
a tri-state buffer having an enable input, a data input coupled to said output of said inverter, and an output that outputs said majority decision of said corresponding binary decisions of said first, second, and third samplers when enabled by said enable input.

15. A method comprising:

operating a four-level pulse amplitude modulation receiver with a four-level pulse amplitude modulation mode and a non-return-to-zero modulation mode in said non-return-to-zero modulation mode, said four-level pulse amplitude modulation receiver having first, second, and third four-level pulse amplitude modulation samplers coupled to a common input;

during said operation of said four-level pulse amplitude modulation receiver in said non-return-to-zero modulation mode, feeding outputs of said first, second, and third samplers to a majority voting circuit, said outputs of said first, second, and third samplers comprising corresponding binary decisions of said first, second, and third samplers;

outputting, from said majority voting circuit, a majority decision of said corresponding binary decisions of said first, second, and third samplers.

16. The method of claim 15, further comprising providing an input signal to said receiver from an offset-compensated analog front end.

\* \* \* \* \*